Patented Oct. 20, 1942

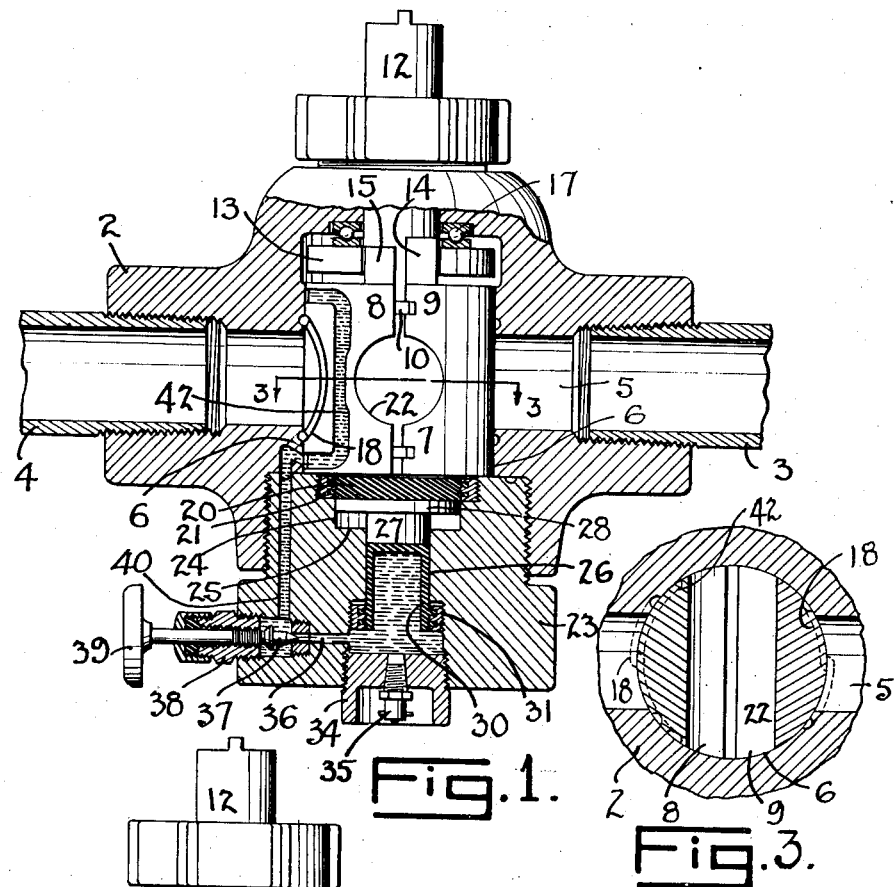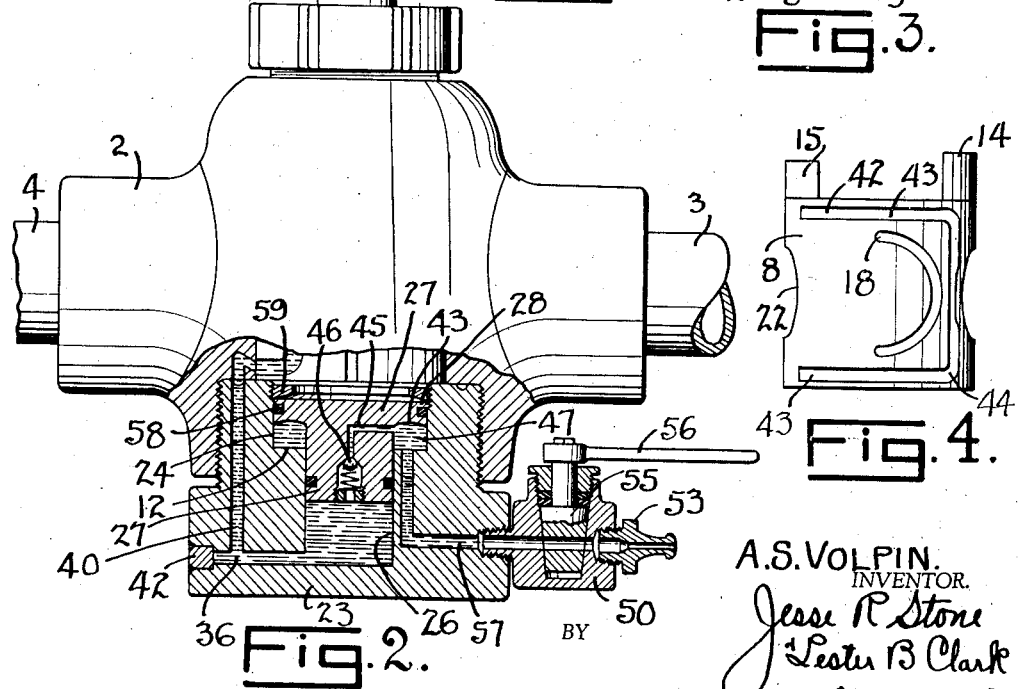

2,299,517

UNITED STATES PATENT OFFICE 2,299,517

COUNTERPRESSURE CONTROL FOR PLUG VALVES

Alexander S. Volpin, Houston, Tex., assignor to Mission Manufacturing Company, Houston, Tex.

Application February 10, 1940, Serial No. 318,248

6 Claims. (Cl. 251—102)

The invention relates to a counter pressure control device for plug valves wherein the pressure thru the valve which is being closed may be conducted to unseat the downstream side of the valve member when the valve is to be moved so as to reduce the turning friction required to open the valve.

In plug valves of the character involved considerable pressure is exerted upon the plug member by the applied pressure in the pipeline being closed by the valve. This pressure is of course applied on the high pressure side of the valve to force the plug member against the seat about the low pressure outlet pipe. In view of the fact that a considerable area is thus exposed to the high pressure difficulty has been encountered in turning the valve from its closed position, particularly where the valve has been closed and seated for a substantial period of time. The present invention therefore contemplates compounding of the pressure from the high pressure side to the plug member so that such pressure may be utilized in opposition to the pressure of the pipe line so as to tend to balance the pressures on the plug.

It is one of the objects of the invention to provide a counter pressure control for plug valve members.

Another object of the invention is to provide a device for compounding the line pressure on a plug valve and then controlling such pressure so that it may be withheld or applied to the downstream side of the valve in unseating the valve.

Another object of the invention is to provide a piston for compounding the line pressure in a plug valve to unseat the valve.

Other and further objects of the invention will be readily apparent when the following description is considered in connection with the accompanying drawing wherein:

Fig. 1 is a vertical sectional view with certain parts broken away to illustrate the lubricating and counter pressure systems.

Fig. 2 is another form of a counter pressure system wherein the release of part of the pressure compounds the line pressure to unseat the valve.

Fig. 3 is a section taken on the line 3—3 of Fig. 1.

Fig. 4 is a face elevation of one of the plug member sections.

In Fig. 1 the valve housing is indicated generally at 2 and the pipes 3 and 4 lead to and from such housing. The passage 5 thru the housing is interrupted by the chamber 6 which receives the plug valve member 7. This member is here illustrated as being made up of complementary halves 8 and 9 which are spaced apart by the spring assemblies 10. The valve member is arranged to be operated by the turning of a stem 12 which carries a head 13 to engage the lugs 14 and 15 on the plug sections respectively. An antifriction bearing 17 absorbs the end thrust on the valve member. This particular type of valve member and the lubrication groove 18 thereof by which the face of the valve sections are lubricated is more specifically described and claimed in the copending application of Dudley C. Sharp, Serial No. 318,246, filed February 10, 1940, for a Lubricated plug valve, which has matured into Patent No. 2,269,887, granted January 13, 1942.

Fig. 1 illustrates the base of the valve member 6 as being closed by a diaphragm or resilient plate 20 which is in turn held in position by an anchoring ring 21 on the base member 23. The upper face of this plate or diaphragm is exposed to the pressure from the high pressure line. Such pressure is available in the passage 22 which extends thru the valve member and is, of course, available on this disk or plate 20. The valve chamber is reduced at 24 to form a shoulder 25 which defines an additional passage 26. A piston 27 having an enlarged head 28 is arranged within the chambers 24 and 26 so that it may slide in accordance with the flexing or movement of the diaphragm 20. Positioned below the bottom end of the stem portion on the piston 27 is a diaphragm unit 30 which is in the form of a resilient sleeve anchored in position by the ring 31 and tending to close the chamber 26. A closure plug 34 fills the bottom end of the chamber 26 and carries a lubricant pressure receiving fitting 35 by which lubricant may be introduced inside of the sleeve 30.

A lateral passage 36 extends from the chamber 26 and is arranged to be closed by a needle valve 37 mounted in a bushing 38 and controlled by a handle 39. When this valve is closed the lubricant is confined within the diaphragm 30 and the base of the recess 26. When however, the wheel 29 of this valve is operated it will open a passage 40 to allow lubricant to flow from within the diaphragm 30. This passage 40 leads upwardly to the face of the seat 6 in the valve chamber and merges with the counter pressure groove 42 which is formed on the face of the plug valve member. This counter pressure groove is best seen in elevation in Fig. 4 and comprises the upper and lower legs 43 and the vertical portion 44. This part of the structure encloses the sealing groove 18 as best seen in Fig. 4. When the valve 37 is open the pressure in the diaphragm 30 will cause a flow of lubricant into the groove 42 of the member which pressure will tend to balance or compensate for an equivalent pressure on the valve from the high pressure line. In some instances or if the apparatus is so proportioned the compounded pressure may be sufficient that it will effect movement of the plug member 8 away from the seat in the valve housing.

In order to apply this counter pressure, attention is directed to the fact that pressure can be compounded if the upper end of the piston 27 is of substantial greater area than the lower portion thereof. The pressure in the high pressure pipe 3, would be available upon the exposed area of the diaphragm 20 and thus on the enlarged area 28 of the piston 27. In view of the fact that the smaller portion of the piston 27 is substantially less than that of the upper portion, it seems obvious that the pressure applied to the diaphragm 30 and the lubricant therein by the small end of the piston will be in the same ratio as are the sizes of the top and bottom of the piston 27. It seems clear that the desired amount of compounding can be obtained by the varying of the relative sizes of these parts of the piston.

In operation the device will be assembled as shown in Fig. 1 and lubricant introduced into the diaphragm 30. The needle valve 37 will then be closed and the valve will be held in position during its normal operation. If such operation causes a freezing of the valve plug member against the seat in the housing or for any reason it is found that it is impossible or impractical to release the plug member, then the needle valve 37 can be opened so as to allow the high pressure in the pipeline to be compounded and applied to the lubricant in the passage 40. This lubricant in turn will flow under such pressure into the channel 42.

It is intended that the parts may be so proportioned and arranged that either a substantial amount of the pressure exerted on the valve member can be balanced by this counter balance system or the entire amount or even in some instances more than the amount of the line pressure can be applied to the valve member in unseating it by this counter pressure device. It seems clear that by varying the ratio of the large and smaller portions of the piston 27 that the desired ratio or pressure can be applied to the counter pressure device. It is the intention to apply sufficient pressure automatically thru the flexing of the diaphragm 20 so as to obtain the desired pressure in releasing the valve.

Fig. 2 shows a slightly modified form of the device wherein the parts are the same as just described except that the left hand end of the passage 36 has been closed with a plug 42 and the valve 37 displaced. In the Fig. 2 construction the piston 27 is of a peculiar configuration in that the chamber formed by the under side 43 of the piston and the shoulder 12 is in the form of a pressure fluid reservoir. This reservoir leads into the passage 45 in the piston which is controlled by a check valve 46. If there is a predominant pressure in the chamber above the shoulder 12 then the lubricant or pressure fluid therein will cause opening of the valve 46 so that such fluid can move into the chamber 26 in the base 23. In order to confine the lubricant in the chamber 26 and the chamber 47 a stop cock 50 has been applied to the end of the passage 57 leading into the chamber 47. A lubricant pressure receiving fitting 53 is carried by this stop cock so that pressure applied thru the cock and the passage 57 into the reservoir 47 can be dropped by the turning of the stop cock plug 55 by means of the handle 56. The closing of this valve of course traps the lubricant or fluid in the chamber 47. The piston 27 has seals 58 thereon to form a seal with the walls of the chambers 24 and 26. This piston is confined against excessive movement by a stop ring 59. The other parts are as described in connection with the form of the valve shown in Fig. 1.

In operation when the valve member or plug is closed the line pressure will be available on the upper exposed surface of the head 28 of the piston 27 so that the piston would be normally urged downward. The liquid or fluid under pressure in the chamber 47 prevents such downward movement and the pressure in the chambers 47 and 26 is equalized by the valve 46. In this manner pressure may be applied and trapped in position in the reservoirs so that the piston 27 would normally be inoperative and immovable.

When it is desired to open the valve it is only necessary to operate the handle 56 to open the stop cock 50. This opening of the cock allows the liquid in the chamber 47 to reduce to atmospheric pressure. This concentrates or compounds the pressure on the entire upper surface of the head 28 of the piston on the lower surface thereof. Due to the fact that the lower portion of the piston in the chamber 26 is of a lesser diameter it seems obvious that the pressure from the pipeline will be thus compounded and this compounded pressure will be available in the groove 42 to unseat the valve member.

Broadly the invention contemplates a counter pressure device for valves wherein the line pressure is utilized to tend to balance the pressure on the plug valve member or if desired to unseat such plug.

What is claimed is:

1. A plug valve of the character described comprising a housing and a plug member, a counter pressure groove about the port through the valve housing, and a differential pressure device carried by said valve to exert a counter pressure in said groove to assist in balancing the pipe line pressure on said plug to facilitate movement of the plug, said device including a differential piston to compound the line pressure, and means to conduct such compounded pressure to said groove.

2. A plug valve of the character described comprising a housing and a plug member, a counter pressure groove about the port through the valve housing, and a differential pressure device carried by said valve to exert a counter pressure in said groove, which is higher than the line pressure so as to assist in balancing the pipe line pressure on said plug to in turn facilitate movement of the plug, said device including a piston exposed to the line pressure and having differential areas thereon, and means to conduct the higher pressure from said piston to said groove.

3. A plug valve of the character described comprising a housing and a plug member, a counter pressure groove about the port through the valve housing, and a differential pressure device carried by said valve to compound the line pressure to provide a higher pressure means to conduct such compounded pressure to said groove to assist in balancing the pipe line pressure on said plug to facilitate movement of the plug, said device including a piston one area thereon exposed to line pressure, an opposed lesser area connected to said conducting means, a third area opposed to said one area, and means to supply pressure fluid to and release pressure fluid from said third area.

4. A lubricated plug valve including a housing, a plug member therein, a lubricant reservoir, means utilizing the line pressure to force lubricant from said reservoir to the downstream end of said valve when said valve is in closed position, said means including a device for compounding the line pressure to provide a unit area pressure on the downstream side of the plug in excess of the unit line pressure.

5. A lubricated plug valve including a housing, a passage therethrough, a valve plug chamber, a valve plug therein, means to turn said plug, distribution means at the face of the plug and chamber on the downstream side including a groove to distribute sealing material and a separate channel, means for compounding the line pressure to apply a pressure in excess of the line pressure to a fluent material and conducting such material to said separate channel.

6. A lubricated plug valve including a housing, a plug member therein, means to lubricate the sealing faces between said housing and plug, and means independent of said first means to exert a pressure on the downstream side of said plug to release the plug for turning, comprising means to compound the line pressure to provide a pressure in excess of the line pressure and to conduct said excess pressure to the downstream side of said plug.

ALEXANDER S. VOLPIN.